Nov. 2, 1937.　　　　A. MADLÉ　　　　2,097,632
POWER TRANSMISSION MECHANISM
Filed Sept. 19, 1933　　　2 Sheets-Sheet 1
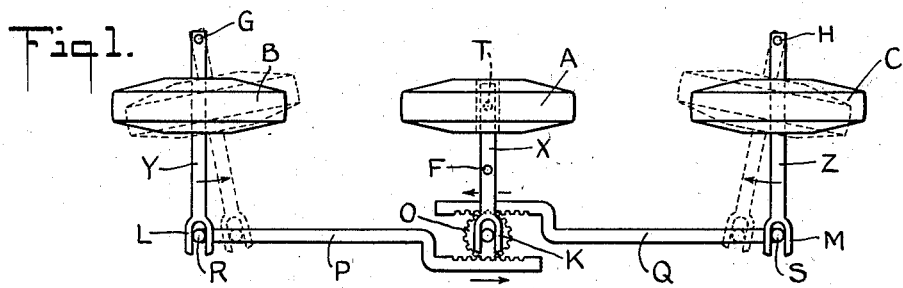
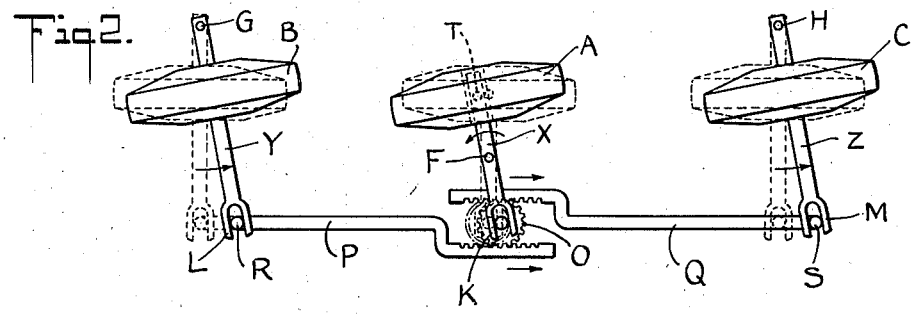
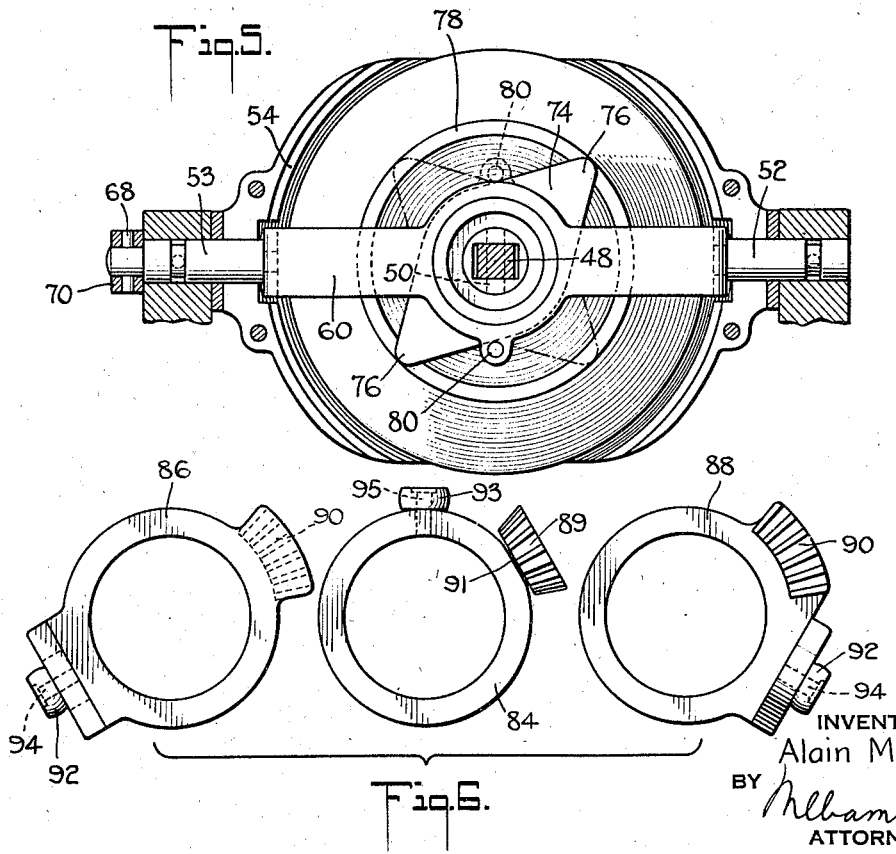
INVENTOR
Alain Madlé
BY
ATTORNEY Nov. 2, 1937.  A. MADLÉ  2,097,632
POWER TRANSMISSION MECHANISM
Filed Sept. 19, 1933  2 Sheets-Sheet 2
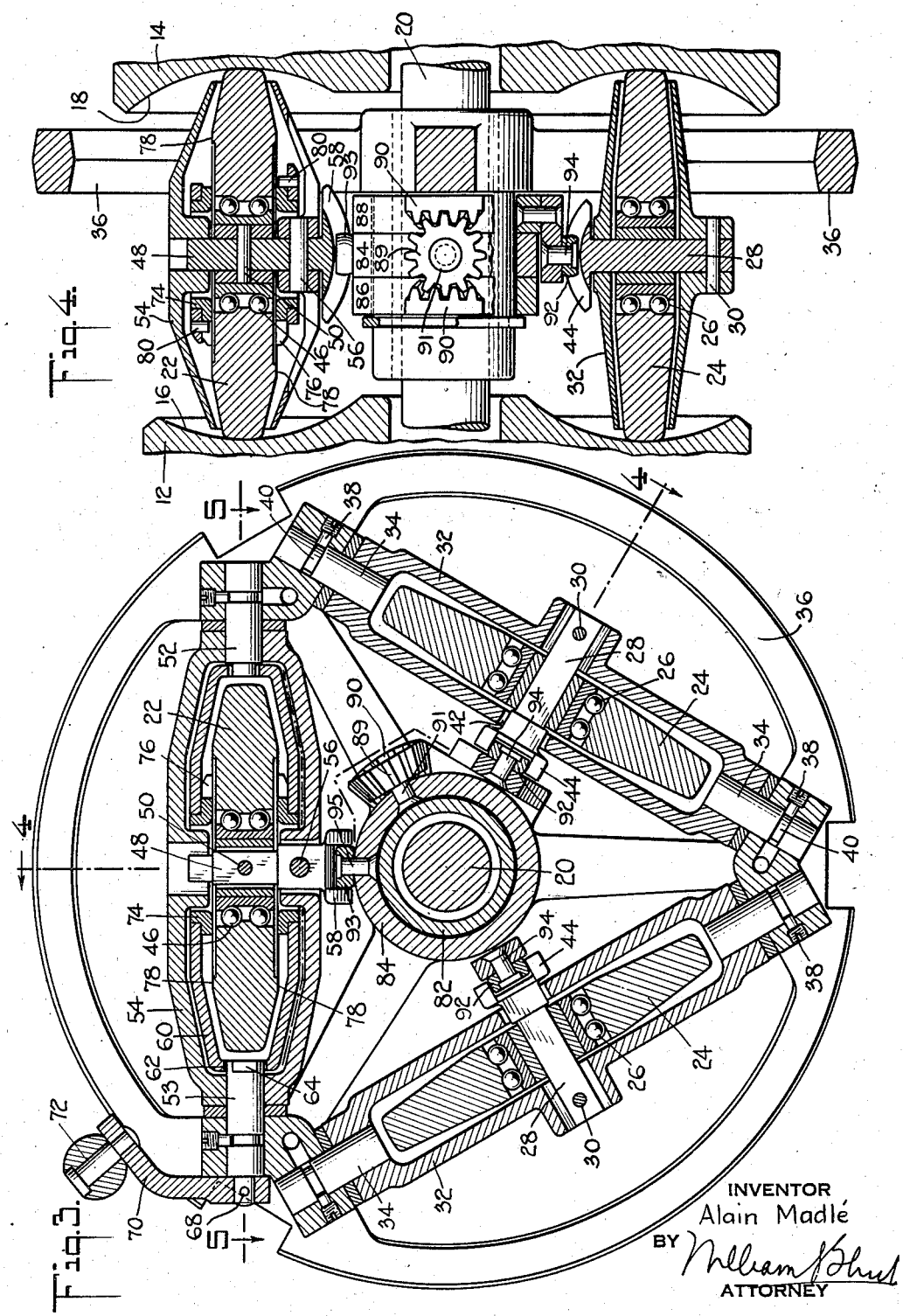
INVENTOR
Alain Madlé
BY
ATTORNEY Patented Nov. 2, 1937

2,097,632

UNITED STATES PATENT OFFICE 2,097,632

POWER TRANSMISSION MECHANISM

Alain Madlé, Bristol, Conn., assignor to Erban Operating Corporation, New York, N. Y., a corporation of New York Application September 19, 1933, Serial No. 690,073

19 Claims. (Cl. 74—200)

This invention relates in general to power transmissions and more particularly to arrangements whereby the transmission of power is effected by adhesive contact.

The theoretical ideal of power transmission by adhesive contact requires a system in which a single rolling body transmits power from a driven race to a driving race. In this case all the torque is transmitted through this single rolling body, and we are not concerned with problems involving asymmetry in the torque distribution due to the use of a plurality of rolling bodies.

In practice, however, it is found advisable to employ a plurality of rolling bodies for the torque transmission between the races, and this necessitates a division of the torque between the rolling bodies. For such a construction the optimum is attained when the torque is equally divided among the rolling bodies. The attainment of such equal division of the torque is not, however, a simple matter, unless special provisions are employed.

Where a plurality of rolling bodies are used, it will frequently happen, in fact it may be stated to be the rule, that a state of torque distribution unbalance exists between the rollers, whereby the ratio of power transmission is different as between the rollers. This state of unbalance is generally due to variations from the ideal in (1) the surfaces of the races or (2) the surfaces of the rollers or (3) the structure supporting the races and the rollers, and may be the result of manufacturing difficulties or wear. Such variations will give rise to variation in the ratio of transmission as between the rollers, and the driving force on the roller rotating at the higher speed will be greater than that acting on the rollers rotating at a lower speed. As a consequence, the more rapidly rotating roller will take up a greater proportion of the power, and, due to its relatively excessive speed, it will slip in relation to the races, causing great power losses.

A further result of the inequality in the division of the torque as between the rollers is a loss in traction, between the races and the rollers. When all rollers are transmitting an equal amount of torque a certain pressure is needed to maintain adhesive contact between the races and rollers. Assuming now that one of the rollers transmits more than its equal share of the torque, the pressure to maintain adhesive contact for that roller must be increased, and since the same pressure is used on the other rollers as well, provision must be made, in the form of parts of greater size, to permit the application of this increased pressure.

Among the objects of my invention is therefore the provision of means for causing the power transmitted by each roller always to bear a predetermined ratio to the total power transmitted by the system of rollers, and in a particular application, to distribute the power equally among the rollers.

I attain this objective generally by such an association of the rollers that any inequality in the ratios of transmission that may exist therebetween, will automatically operate to cause a change in the relative ratios of the transmission to an equality, and in the specific embodiment herein illustrated, this association takes the form of an arrangement for automatically producing a relative tilt between the rollers as a result of which positional and functional equalization will ultimately be attained.

Another object of the invention is the provision of a novel arrangement whereby, in a system of races and rollers operating by adhesive contact, the ratio of transmission of the system is changed by the tilting of one of the rollers, which in turn causes the tilting of the other rollers.

A further object of the invention is the provision in a system of races and rolling bodies operating by adhesive contact of such an association of the rollers that tilting for speed ratio change purposes of one of the rollers will cause a corresponding tilt in the other rollers, and any inequality in the distribution of the torque as between the rollers of the system will automatically cause a relative tilting of the rollers with reference to each other, so as to establish an equality in the torque distribution between the rollers at any predetermined speed ratio of transmission.

While my invention has been shown in connection with a power transmission system, it is to be understood that as to certain phases thereof it may have other applications. And, while it has been disclosed in one practical embodiment thereof, it will be obvious that it may be embodied in many other forms such as will readily suggest themselves to those skilled in the art, and that I do not limit myself in relation thereto in any manner other than as defined in the claims herein.

For the attainment of the above mentioned objects, and such other objects as will hereinafter appear or be pointed out, I have illustrated one form of my invention in the drawings, in which—

Figure 1 is a diagrammatic representation of a system of rolling bodies interconnected by equalizing means, and illustrating the action thereof.

Figure 2 is a view of the same system showing a different action of the equalizing means.

Figure 3 is a transverse view through an illustrative embodiment of my invention.

Figure 4 is a sectional view taken on the line 4—4 of Figure 3, looking in the direction of the arrows.

Figure 5 is a sectional view taken on the line 5—5 of Figure 3 looking in the direction of the arrows.

Figure 6 is a detail view of certain parts of my construction.

The invention will be explained by first elucidating the underlying principles of operation, with the aid of Figures 1 and 2 of the drawings, and then describing the application thereof in a practical embodiment such as illustrated in Figures 3 to 6 inclusive.

Referring to Figure 1 of the drawings, it will be observed that I there show a system of three rolling bodies with their axes parallel and in the plane of the paper as shown in the full line position. These rolling bodies or rollers are denoted respectively by the letters A, B and C and they are mounted for rotation about the respective shafts, X, Y and Z, these shafts being pivoted respectively at F, G and H to the frames carrying the rollers. It will be observed that whereas the pivots G and H are located at the upper extremities of the shafts Y and Z respectively and spaced from the rollers, the pivot F is located on an intermediate portion of the shaft X and a distance below the roller A, and that this pivot is therefore distinguished from the pivots G and H in its location with respect to its roller. While this feature is not illustrated in Figures 1 and 2, it is to be understood that these rollers are located between a pair of races, one of which serves to drive them and the other of which is driven by them.

In the diagrammatic showing of Figures 1 and 2, one end of each shaft X, Y and Z is shown as terminating in a fork, these forks being denoted respectively by K, L and M. Within the fork K is slidably pivoted a pinion O in toothed engagement with the rack bars P and Q, which are pivoted at their other ends, R and S, within the forks L and M respectively.

The effect of this arrangement will be to permit deviation of rollers B and C from their plane of rotation, as indicated in full lines in Figure 1, into a position such as that indicated by the dotted lines in Figure 1, without in any way affecting the position of roller A. The only condition of restraint affecting the rollers B and C is that as long as the shaft X of roller A remains in position, the angling of roller B must be equal in amount, but opposite in direction to the angling of roller C, this constraint being imposed by the rack and pinion connection.

The peripheral force acting on roller B will tend to deviate it from its plane of rotation, due to its pivotal mounting at G, and the roller C is similarly affected by its peripheral force in relation to the pivot H. Assuming that such deviation tends to take place toward the right, as in Figure 2, it will be observed that the rack bars P and Q also tend to move to the right, and since connection between P and Q is by means of the pinion O, which they engage on opposite sides, such tendencies of P and Q oppose each other. If the force acting along P is equal to that acting along Q, a condition of balance will exist. If these forces are unequal, on the other hand, rotation of pinion O about its axis results, until the forces in P and Q balance each other. This action would take place even if the axis of pinion O were held fixed. It also takes place when the axis of pinion O is not fixed, as will be more fully explained hereinafter.

Assuming now that P and Q balance each other about the axis of O, which axis is fixed, and that then one of the rollers, say B, is displaced from its plane of rotation, as by an excess peripheral force, the displacing force will be opposed by a force along P which will turn pinion O and move Q oppositely to P, and therefore result in displacing the plane of rotation of roller C oppositely to that of B. This has the effect of inclining and therefore tilting C so as to increase the peripheral force thereon, while at the same time reducing that on B, and the adjustment will proceed until the forces on B and C are balanced, at which time the action will cease. It may be observed that investigations indicate that such balancing action is highly critical and highly stable, and that a sharp and sudden transition takes place from a condition in which one roller transmits almost the entire load, to a condition of balance.

The dotted line position of Figure 1 indicates how the construction described causes tilting of the rollers in opposite directions.

Turning now to another phase of the operation of this system, the effect of tilting the master roller A will be considered. Such tilting is produced by any suitable control means when it is desired to change the ratio of the transmission, and has the effect of changing the peripheral force of the roller A, either to increase it or to decrease it. Such change in force is immediately transmitted to the other rollers, B and C and results in their tilting in a similar manner.

In Figure 2 is illustrated the effect of tilting of the shaft X of roller A from the full line position into the dotted line position, in other words, an angling of the shaft X about the pivot F, whereby the pinion O is moved to the right of the figure. Assuming that the resistance offered by each of the rollers B and C to angling is the same, so that there will be no tendency for the pinion O to turn, the effect of the movement of pinion O to the right will be to move the rack bars P and Q to the right, so as to incline the axes Y and Z from the dotted line position into the full line position of Figure 2.

As already remarked, the peripheral force acting on roller B will tend to cause it to move about the pivot G, and similarly the roller C will tend to pivot about H, but this pivoting movement is opposed by the similar pivoting tendency of roller A, because of the location of pivot F on the lower side of the roller, the result of which is that if, for instance, the peripheral forces on the rollers tend to move each of them to the right in Figure 2, the forks L and M will tend to move to the right, but the fork K will tend to move to the left. By suitably proportioning the leverages involved in locating the pivots F, G and H, a balance between the forces may be established so that there will be an equilibrium position in which stability for the system is attained. When this state of stable balance is disturbed by tilting the master roller A, the rollers B and C will be at once constrained to follow, and the system will assume a new position in which the peripheral forces are again balanced.

Summing up the effect of the actions just described, it will be seen that there is provided a system in which the peripheral forces acting on the rollers must at all times balance. If such balance is disturbed, compensating actions take place until equilibrium is again attained.

If the peripheral force on one roller, say roller B, exceeds that on C, interaction of P, Q and O will result in an equalizing effect, and equilibrium will be attained when the peripheral force on B equals that on C.

Such motion of P and Q to balance the forces on B and C will take place about the axis of O, and will not affect the position of said axis, unless at the same time there is a state of unbalance between the combined forces on B and C as opposed to the force on A. Such state of unbalance will be corrected by motion of the axis of O as has already been explained in connection with Figure 2.

Similarly, a state of unbalance in which the forces on P and Q balance each other, but their combined effect does not balance the force on A, will be corrected by motion of the axis of pinion O only, and without turning of the pinion, both P and Q then moving in the same direction and to the same extent.

It will also be observed that the rolling body A is indicated as pivoted at T on its shaft X, whereas the rolling bodies B and C are intended to have no such pivotal relation with their respective shafts Y and Z. The purpose of this will appear more fully later, but at this stage it may be stated that the roller A is intended to perform the function of a master roller, adapted for manual control, and that the rollers B and C are intended to follow the master roller A in its tilting movements, without at the same time being restricted in their balancing movements in relation to each other, as described in connection with Figure 1.

In Figures 3, 4, 5 and 6 I have illustrated a practical embodiment of my invention operating on the principle of the diagrammatic showing of Figures 1 and 2. Referring particularly to Figures 3 and 4, I have there shown a pair of races 12 and 14 provided with toric raceways 16 and 18 respectively, said races being adapted for rotation about an axis coincident with the axis of a shaft 20 passing centrally through the system, and which it is unnecessary to describe further in order to explain my invention. One of these races will constitute a driving member, the other a driven member; and, as will appear later, the system is so constructed that either race may serve as the driving member and either may serve as the driven member. In other words, the system is reversible.

A system of rollers serves to transmit motion and power from the driving race to the driven race, this being effected by adhesive driving contact of the rollers with the races. One of these rollers or rolling bodies, 22, corresponds to the roller A of Figures 1 and 2, and is the one which I designate as the master roller. The other two rollers, which I have indicated by the numeral 24, correspond to the rollers B and C of Figures 1 and 2, and are what I term follower rollers since they are not adapted for manual control, but their tilting movement is due entirely to movements initiated by the roller 22.

The rollers 22 and 24 are all tiltably mounted so that as their inclination changes, the points of contact of the rollers with the races 12 and 14 also change and with it the ratio of transmission changes.

To adequately describe the construction which permits the tilting of the rollers and of their interaction so as to attain a state of balance, it will be convenient to commence with a description of one of the rollers 24. Each roller 24 is journaled in any preferred or convenient manner such as by ball bearing 26, on shaft 28, corresponding to shaft Y of Figure 1, and this shaft is mounted for limited angular movement within a frame 32 about the pivot pin 30. Frame 32 is pivotally mounted on pins 34 trunnioned in the frame 36, which is common to the rollers, and which is relatively fixed. The axis of tilting of frame 32 is at right angles to the axis of rotation of the races and lies in the plane of rotation of the rollers, and intersects their axis of rotation at a right angle. It will be understood, of course, that means such as a retaining screw 38 engaging the groove 40 on each pin 34 may be provided to retain the pin 34 in position.

From this description of the mounting of roller 24, it will be clear that the roller may rotate about its shaft 28 so as to transmit motion from one of the races 12 and 14 to the other. At the same time, it may change its plane of rotation by pivotal movement about the pin 30, and it may further change its plane of rotation as a result of tilting of the frame 32 about the pins 34.

It will be well now to consider the effect of the application of a circumferential driving force to the roller through the driving race. Assuming that this driving race is above the plane of the paper in Figure 3, and rotating about a central axis (that of shaft 20) in a clockwise direction, it will be seen that the tendency of its driving force will be to cause the roller to move counter-clockwise about the axis of pin 30. This motion about pin 30 is resisted by the interconnection of the shaft 28 with the other rollers, as will be hereinafter described. Assuming, however, for the moment, that the roller is free to pivot about the pin 30, it will be noted that such counterclockwise motion will cause the roller to run outwardly on the driving race which is assumed to be below the plane of the paper in Figure 3, and that such outward movement can only take place by a tilting of the plane of the roller about the pins 34 which, of course, is accompanied by a corresponding reduction in the ratio of transmission because of the shifting of the contact points of the roller and the races, whereby the contact point on the driven race moves outward from its axis, and that on the driving race inward. To permit the pivotal movement of shaft 28 about pin 30, it is given a slight lateral freedom of movement within frame 32 as indicated at 42 in Figure 3, but there is no such freedom of movement at right angles to the axis of pin 30, since none is needed, as can be seen in Figure 4.

At the inner end of shaft 28 is provided an arcuately-grooved channeled member 44 and the center of curvature of the groove of this member is located on the axis of pins 34. The function of this channeled member will be explained in what follows.

It is to be understood that the mounting of all the rollers 24 is identical.

The mounting for the master roller 22 will now be described.

This roller is journaled in ball bearings 46 surrounding shaft 48, these ball bearings themselves being mounted to swivel on pin 50, passing transversely through the shaft 48, in a direction parallel to the axis of shaft 20. The axis of pin 50 coincides with a line passing through the points of contact between the roller 24 and the races.

The shaft 48 is mounted for pivotal movement within a frame 54, a pin 56 being provided in the frame 54 for that purpose. This pin 56 corresponds in function to the pins 30 of the follower rollers but is located on the inside of the roller, whereas the pins 30 are located outside of the roller. Frame 54 is pivotally supported from frame 36 by pins 52 and 53, in a manner similar to the mounting of rollers 22. The inner end of shaft 48 carries an arcuately-grooved channel member 58 similar to the corresponding member already described for the follower rollers.

It will therefore be clear that the roller 22 may rotate freely about shaft 48, and in addition may angle about the axis of pin 50, which axis passes through the points of contact between the roller and the races, and further that this roller may change its plane of rotation about the axis 56 which forms the pivotal support of shaft 48, this axis being parallel to that of pin 50 and also to the shaft 20.

Located within the frame 54 is an inner frame 60, designed to prevent relative rotation and which may be in the form of an elongated, flattened opening 62 provided at one end of the frame into which fits the flattened end 64 of one of the pins 53, the latter being connected at its outer end by means, such as the pin 68, to a crank member 70, which may be connected by any preferred or suitable mechanism indicated in general by 72, to a conveniently located control.

Rotatably carried by the frame 60 is a pair of members 74, most clearly indicated in Figure 5, each of which is provided with oppositely disposed extensions 76 that are adapted to contact with a raised annular portion 78 provided on the roller for a purpose to be explained. As the roller rotates, the members 74 will at first be carried along therewith because of the frictional contact between the portions 76 and the annular portions 78 but they will soon be brought to a stop by pins 80 provided on opposite sides of the frame 60. It will be obvious that the position that the extensions 76 will assume will depend on the direction of rotation of the roller 22. If, for instance, in Figure 5, the roller is rotating counter-clockwise, it will come to a stop, owing to contact between extensions 76 with pin 80, in the full line position shown in Figure 5, but if the direction of the roller is reversed, it will be brought to a stop in the position shown in dot and dash lines. It is to be understood that the pin 80 on the lower side of roller 22 as shown in Figure 5 will be located so that it will cooperate with the upper pin to cause the action described in the next paragraph.

The function of the adjusting mechanism for roller 22 will now be explained. Movement of the crank 72 will result in tilting of the frame 60. This again will result in a pressure of the extensions 76 on the annular portions 78 which will cause an angling of the roller about the axis of pin 50. As a result of this angling however, the roller will tend to run outward on the driven races. In other words, it will tend to run in a spiral path and this will result in a tilting of the frame 54 about pins 52 and 53 to accommodate this spiraling, as well as a pivotal movement of shaft 48 about pin 50. After frame 60 has attained its new position as the result of the adjustment, if the roller persists in its spiral movement, it will press against the extension 76 on the opposite side of the roller by which the roller will be brought into a position of rest in its new adjusted position.

The movement of the rollers having been explained, it remains to describe the equalizing mechanism whereby the follower rollers are kept in balanced relation, whereby the master roller is balanced against the follower roller, and whereby adjustments impressed on the master roller will be transmitted to the follower roller.

Mounted on a sleeve 82 concentric with the shaft 20 of the system are three sleeves or rings 84, 86 and 88, illustrated separately and in detail in Figure 6 and in assembled position in Figure 4. Sleeve 84 carries a bevelled toothed pinion 89 journalled on pin 91 and also a roller 93, which is journalled on pin 95 carried by sleeve 84 so that it may roll and slide within the arcuate groove of channel member 58. Sleeves 86 and 88 each carry a toothed bevelled segment 90 adapted to mesh with the bevelled pinion 89, as shown in Figure 4, and each of said sleeves also carries a roller 92 mounted so as to swivel freely on a pin 94 carried by the sleeve, so as to roll and slide within the arcuate groove of the channeled member 44 carried on the shaft 28 of each follower roller.

The mechanism last described provides a construction which is equivalent to that of Figure 1. When it is attempted to tilt the master roller to increase the speed of the output shaft this roller will instantaneously take an increased circumferential force, due to which the channeled member 58 will exert a lateral pressure against roller 88 that will be transmitted to the shafts 28, and, owing to the action already described, will result in their tilting about the axis of pins 34. A sympathetic relation is thereby established between the follower rollers and the master roller so that tilting of the master is always simultaneous with tilting of the roller. As a result of the location of pins 30 and pin 56, an equalizing effect between the system of follower rollers and the master roller is obtained, so that whenever tilting of one set of rollers occurs, tilting of the other set must be coincident therewith until balance is established. On the other hand due to the two segments 90, which correspond to the racks P and Q of Figure 1, the follower rollers balance each other independently of their relation to the master.

Having thus described my invention and illustrated its use, what I claim as new and desire to secure by Letters Patent is:

1. In a variable speed power transmission system, a rotating toric driving race, a rotating toric driven race, rolling bodies in adhesive contact with said races and adapted to transmit power therebetween, two of said rolling bodies being each rotatable on a support mounted within a frame so as to be tiltable about an axis parallel to the line joining the points of contact between said races and rolling bodies and spaced outwardly from said line in relation to the rolling bodies, and each of said frames being mounted for tilting about an axis in the plane of the roller it carries and said axis being perpendicular to the first-mentioned axis, and whereby when said roller support tilts about its axis, said rollers are caused to shift their plane of rotation and by their motion along the race surfaces to tilt about said second axis, a pair of elements each mounted to pivot about the axis of said races and each in slidable engagement with the support of one of said rolling bodies, a member engaging the said elements associated with the respective rolling bodies and adapted to cause both to move in unison about said first-mentioned axis without destroying their freedom to move oppositely to each other; and said member being in slidable engagement with the supporting shaft of a master roller, whereby movements of the master roller shaft will be transmitted to said member and to said elements to cause said rolling bodies to move in unison without affecting their freedom to move oppositely about said first-mentioned axis.

2. A power transmission mechanism having a toric driving race, a toric driven race, and a set of three rollers between said races and in adhesive rolling contact therewith so as to transmit power therebetween, said rollers being tiltable in relation to said races for purposes of varying the ratio of speed transmission, and compensating means between said rollers whereby said rollers will automatically assume an equal share of the load, said compensating means comprising a mounting for the rollers permitting them to change their plane of rotation, mechanism interconnecting said mountings whereby changes in the plane of rotation of a particular one of them, or master roller, will cause similar changes in all the other rollers or follower rollers of the system, and whereby the change in the plane of rotation of one of said follower rollers will cause a change in the opposite direction of the other of said follower rollers and without affecting the plane of rotation of the master roller.

3. In a power transmission system, a driving toric race and a driven toric race coaxial therewith, rollers intermediate said races and in adhesive driving contact therewith for transmitting power therebetween, each roller being mounted in a pivoted frame adapted to permit its tilting so as to vary the ratio of transmission, one of said rollers being a master roller mounted for angling about a line passing through the points of contact of the roller with said races, and the other rollers follower rollers mounted so as to be capable of angling about a line parallel to but offset from a line passing through their points of contact with the races, control means for causing angling of said master roller, and mechanical connections between said rollers whereby the forces acting on said rollers will balance each other when they are in similar positions, and whereby, when said master roller is angled, it will be caused to tilt, and will cause a state of unbalance resulting in tilting of the follower rollers in sympathy with the master until all rollers are again in similar positions and the balance is restored.

4. A power transmission system having a pair of races, a set of rollers for transmitting power from one race to the other and in adhesive contact therewith and symmetrically positioned in relation to said races, said rollers being each adapted to tilt about a pivotal axis lying in the plane of the roller and perpendicular to the line passing through the points of contact of the roller with the races and also about an axis parallel to the axis of said races, said last mentioned pivotal axis being positioned between the roller and the race axis for one roller, and outwardly of the roller for the other rollers, and means interconnecting said rollers, whereby, when said one roller is caused to move about its inwardly spaced axis, said other rollers will be caused to move similarly about their outwardly spaced axes, but will be free at the same time to adjust themselves in opposite directions.

5. In a power transmission system, a toric driving race, a toric driven race, rollers between said races and in adhesive rolling contact therewith so as to transmit power therebetween, means supporting said rollers for tilting with respect to said races for purposes of varying the ratio of speed transmission and compensating means between said rollers whereby they will be caused to tilt so as to equalize the distribution of power therebetween, said compensating means comprising a mounting for each of the rollers whereby it may pivot about an axis parallel to but spaced from the line passing through the contact points between the roller and said races, said axis for certain of the rollers being positioned inwardly of said line, and for other of said rollers being positioned outwardly of said line.

6. Apparatus as in claim 5 in which each roller is carried by a frame tiltable about an axis perpendicular to the line passing through the contact points and in which the axis of pivoting is provided by a pivotal mounting carried by the tiltable frame.

7. In combination with a power transmission system having a driving toric race, a driven toric race coaxial therewith, and rollers intermediate said races and in adhesive driving contact therewith for transmitting power therebetween, and said rollers each being mounted in a frame for tilting so as to vary the ratio of transmission, and one of said rollers being a master roller; a mounting for said master roller whereby it is adapted for angling about a line passing through the points of contact of the roller and the races, and for pivotal movement about an axis parallel thereto and coplanar with the axis of the races.

8. In combination with a power transmission system having a driving toric race, a driven toric race coaxial therewith, and rollers intermediate said races and in adhesive driving contact therewith for transmitting power therebetween, and said rollers each being mounted in a frame for tilting so as to vary the ratio of transmission, and one of said rollers being a master roller; and means for supporting said master roller for angling about a line passing through the points of contact of the roller and the races, and for pivotal movement about an axis parallel thereto and coplanar with the axis of the races, said parallel axis being positioned intermediate the axis of angling and the axis of the races.

9. In a power transmission system having a driving toric race, a driven toric race coaxial therewith, and rollers intermediate said races and in adhesive driving contact therewith for transmitting power therebetween, and said rollers each being mounted in a frame for tilting so as to vary the ratio of transmission, and one of said rollers being a master roller; a mounting for said master roller within said tilting frame comprising a shaft containing the axis of rotation of the roller, and means for supporting said roller rotatably and in pivotal relation to said shaft so as to pivot about an axis perpendicular to the axis of tilting and passing through the points of contact between said roller and said races, and a mounting for said shaft within said frame so as to permit it to pivot about an axis parallel to said axis through the points of contact.

10. In a power transmission system having a driving toric race, a driven toric race coaxial therewith, and rollers intermediate said races and in adhesive driving contact therewith for transmitting power therebetween, and said rollers each being mounted in a frame for tilting so as to vary the ratio of transmission, and one of said rollers being a master roller; a mounting for said master roller within said tilting frame comprising a shaft containing the axis of rotation of the roller, and means for supporting said roller rotatably and in pivotal relation to said shaft so as to permit it to pivot about an axis perpendicular to the axis of tilting and passing through the points of contact between said roller and said races, and said shaft being mounted within said frame so as to pivot about an axis parallel to said axis through the points of contact, said parallel axis being positioned intermediate said axis through the points of contact and the axis of the races.

11. In a power transmission system, a pair of coaxially mounted toric races, a set of rollers for transmitting power between said races and in adhesive contact therewith and symmetrically positioned about the axis of said races, said rollers being each adapted to tilt about a pivotal axis lying in the plane of the roller and perpendicular to the line passing through the points of contact of the roller with the races and also about an axis parallel to the axis of said races, said last named pivotal axis being positioned between the roller and the race axis for one roller, and outwardly of the roller for the other rollers, and means interconnecting said rollers, whereby, when said one roller is caused to move about its inwardly spaced axis, said other rollers will be caused to move similarly and simultaneously about their outwardly spaced axes, but will be free to adjust themselves in opposite directions, and whereby as a result of said motion, the roller will tilt about said first-mentioned pivotal axis.

12. A power transmission system comprising a pair of coaxial races, a set of rollers for transmitting power from one race to the other and in adhesive contact therewith and symmetrically positioned about the axis of said races, said rollers being each adapted to tilt about a pivotal axis lying in the plane of the roller and also lying in a plane perpendicular to the axis of the races, and also about an axis parallel to the axis of the races, said last named axis being positioned between the roller and the race axis for one roller, and outwardly of the roller for the other rollers, and compensating means interconnecting said rollers whereby when said one roller is caused to move about its inwardly spaced axis, said other rollers will be caused to move similarly and to the same extent about their outwardly spaced axes, but will be free to adjust themselves in opposite directions, and to the same extent.

13. In a variable speed power transmission system, a rotating toric driving race, a rotating toric driven race, rolling bodies in adhesive contact with said races and adapted to transmit power therebetween, two of said rolling bodies being each rotatable on a support mounted within a frame so as to be tiltable about an axis parallel to the line joining the points of contact between said races and rolling bodies and spaced outwardly from said line in relation to the rolling bodies, and each of said frames being mounted for tilting about an axis in the plane of the roller it carries and said axis being perpendicular to the first-mentioned axis, and whereby when said roller support tilts about its axis, said rollers are caused to shift their plane of rotation and by their motion along the race surfaces to tilt about said second axis, a pair of elements each mounted to pivot about the axis of said races and each in slidable engagement with the support of one of said rolling bodies, said elements each being provided with teeth, a pivotally mounted pinion member engaging the teeth of said elements associated with the respective rolling bodies and adapted to cause both to move in unison about said first mentioned axis when moved bodily, and to cause them to move oppositely to each other when moved about its pivot; and said member being in slidable engagement with the supporting shaft of a master roller, whereby movements of the master roller shaft will be transmitted to said member and to said elements to cause said rolling bodies to move in unison without affecting their freedom to move oppositely about said first-mentioned axis.

14. In a power transmission system, a single toric driving race, a single toric driven race, at least three rollers between said races and in adhesive rolling contact therewith so as to transmit power therebetween, said rollers being tiltable in relation to said races for purposes of varying the ratio of speed transmission and compensating means operative between said rollers whereby they will be caused to tilt so as to equalize the distribution of power therebetween, said compensating means comprising a mounting for each of the rollers whereby each roller may pivot about an axis parallel to but spaced from the line passing through the contact points of the roller with the races, and also comprising equalizing means operatively connected with less than all of said rollers and free from any other operative connections, whereby operation of the said equalizing means can be caused only by forces transmitted to it from said last-named rollers and independently of the other rollers of the system.

15. Apparatus as in claim 14 in which each roller is carried by a frame tiltable about an axis perpendicular to the line passing through the contact points and in which the axis of pivoting is provided by a pivotal mounting carried by the tiltable frame.

16. In a power transmission system, a single toric driving race, a single toric driven race, at least three rollers between said races and in adhesive rolling contact therewith so as to transmit power therebetween, said rollers being tiltable in relation to said races for purposes of varying the ratio of speed transmission and compensating means between said rollers whereby they will be caused to tilt so as to equalize the distribution of power therebetween, said compensating means comprising a pivotal mounting for each roller whereby it may pivot about an axis parallel to the line passing through the contact points, and also comprising equalizing means, and said equalizing means also including means interconnecting said mountings and said equalizing means whereby the forces tending to cause pivoting of one of said rollers, will tend to move the equalizing means as a whole in one direction while the forces tending to cause pivoting of the other rollers of the system will tend to move parts of the equalizing means in different directions.

17. Mechanism as in claim 16, having manual control means by which pivoting of the master roller may be manually controlled for purposes of speed ratio adjustment, and whereby, because of the balanced opposition of forces, the follower rollers will be constrained to follow.

18. In a power transmission system, a single toric driving race, a single toric driven race, rollers between said races and in adhesive rolling contact therewith so as to transmit power therebetween, said rollers being tiltable in relation to said races for purposes of varying the ratio of speed transmission and compensating means between said rollers whereby they will be caused to tilt so as to equalize the distribution of power therebetween, said compensating means comprising a pivotal mounting for each roller whereby it may pivot about an axis parallel to the line passing through the contact points and means interconnecting said mountings whereby the forces tending to cause pivoting of one of said rollers, or master roller, will be opposed by the forces tending to cause pivoting of the other rollers or follower rollers of the system, said master roller being mounted to pivot about an axis passing through the contact points, for tilting its plane of rotation for purposes of speed ratio change.

19. A power transmission mechanism having a toric driving race, a toric driven race, rollers between said races and in adhesive rolling contact therewith so as to transmit power therebetween, said rollers being tiltable in relation to said races for purposes of varying the ratio of speed transmission, and compensating means between said rollers, comprising a balancing mechanism whereby the power transmitted by one particular roller, or roller of the first group, is balanced entirely by the sum of the powers transmitted by all other rollers, or rollers of the second group, a pivotal mounting for each of the rollers of the second group and means for equalizing the distribution of power between the rollers of this second group by effecting ratio changes of these rollers in opposite directions with respect to each other.

ALAIN MADLÉ.